US010296224B2

(12) United States Patent
Li et al.

(10) Patent No.: US 10,296,224 B2
(45) Date of Patent: May 21, 2019

(54) APPARATUS, SYSTEM AND METHOD FOR INCREASING THE CAPACITY OF A STORAGE DEVICE AVAILABLE TO STORE USER DATA

(71) Applicant: INTEL CORPORATION, Santa Clara, CA (US)

(72) Inventors: Peng Li, Hillsboro, OR (US); William K. Lui, Portland, OR (US); Sanjeev N. Trika, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/387,600

(22) Filed: Dec. 21, 2016

(65) Prior Publication Data

US 2018/0173420 A1 Jun. 21, 2018

(51) Int. Cl.

| | |
|---|---|
| ***G06F 3/06*** | (2006.01) |
| ***G06F 12/10*** | (2016.01) |
| *G06F 12/02* | (2006.01) |

(52) U.S. Cl.

CPC .............. *G06F 3/061* (2013.01); *G06F 3/068* (2013.01); *G06F 3/0656* (2013.01); *G06F 3/0659* (2013.01); *G06F 3/0665* (2013.01); *G06F 12/10* (2013.01); *G06F 3/064* (2013.01); *G06F 12/0246* (2013.01); *G06F 2212/1016* (2013.01); *G06F 2212/152* (2013.01); *G06F 2212/214* (2013.01); *G06F 2212/7201* (2013.01); *G06F 2212/7203* (2013.01)

(58) Field of Classification Search

None

See application file for complete search history.

(56) References Cited

U.S. PATENT DOCUMENTS

| | | | | |
|---|---|---|---|---|
| 2003/0145167 A1* | 7/2003 | Tomita | G06F 3/0608 | 711/114 |
| 2006/0161725 A1* | 7/2006 | Lee | G06F 3/0607 | 711/103 |
| 2011/0191529 A1* | 8/2011 | Matsuyama | G06F 12/02 | 711/103 |
| 2015/0032936 A1 | 1/2015 | Yu et al. | | |
| 2015/0046636 A1* | 2/2015 | Seo | G06F 12/0246 | 711/103 |
| 2015/0347020 A1* | 12/2015 | Yano | G06F 12/0246 | 711/103 |

* cited by examiner

*Primary Examiner* — Brian R Peugh

(74) *Attorney, Agent, or Firm* — Konrad Raynes Davda & Victor LLP; David W. Victor

(57) ABSTRACT

Provided are an apparatus, system and method for using a validity table indicating whether physical addresses have valid data to optimize write and defragmentation operations. A non-volatile memory storage device has non-volatile memory and a main memory. A memory controller reads and writes to the non-volatile memory and maintains in the main memory a logical-to-physical address table indicating, for each logical address of a plurality of logical addresses, a physical address in the non-volatile memory having data for the logical address. The main memory maintains a validity table indicating for each physical address of a plurality of physical addresses in the non-volatile memory whether the physical address has valid data.

25 Claims, 5 Drawing Sheets

APPARATUS, SYSTEM AND METHOD FOR INCREASING THE CAPACITY OF A STORAGE DEVICE AVAILABLE TO STORE USER DATA

TECHNICAL FIELD

Embodiments described herein generally relate to an apparatus, system and method for increasing the amount of user data that can be stored in a storage device by reducing the data stored in the storage device to manage the storage of the user data.

BACKGROUND

Solid state storage devices (for example, solid state drives or SSDs) may be comprised of one or more packages of non-volatile memory dies implementing NAND memory cells, where each die is comprised of storage cells, where storage cells are organized into pages and pages are organized into blocks. Each storage cell can store one or more bits of information. A solid state storage device (SSD) of NAND memory cells uses a logical-to-physical ("L2P") address table to map logical addresses, such as logical block addresses (LBAs) (for example, the address used by operating system write and read commands is typically a LBA), to NAND physical addresses. Each entry of the L2P address table is an Indirection Unit (IU). The indirection granularity is typically 4 Kilo Bytes (KB), i.e., each IU maps eight 512 bytes (B) sectors or one 4 KB sector to a portion of a physical NAND page.

In certain NAND SSDs, a band comprises erase blocks of pages in the NAND that may be erased at the same time. A band extends across the NAND storage dies, such that there are multiple bands extending across the storage dies forming rows of data across the storage dies. At the end of each band, such as in the last storage die, there may be a data structure referred to as a band journal that includes physical-to-logical address (P2L) information for all data stored in the band, which indicates the logical address of data in each physical address in the band.

The band journal P2L information may be used during internal defragmentation of a band, also known as band relocation, to reclaim space in the NAND. When defragmenting a band, the band journal P2L information is read to obtain the LBAs for the physical NAND addresses and then to check if the entry in the L2P address table for the obtained LBAs indicates the physical address being considered for defragmentation. If there is a match of the physical addresses, then the data for the physical address in the band is valid and the data may be defragmented.

Further, the band journal may be used to assist in fast power-loss-recovery of the L2P information by determining the logical addresses for physical addresses in the P2L table, and then updating the L2P information to indicate the physical addresses for the logical addresses as indicated in the P2L information.

There is a need in the art for improved techniques for maintaining information on physical and logical addresses for a non-volatile memory device.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
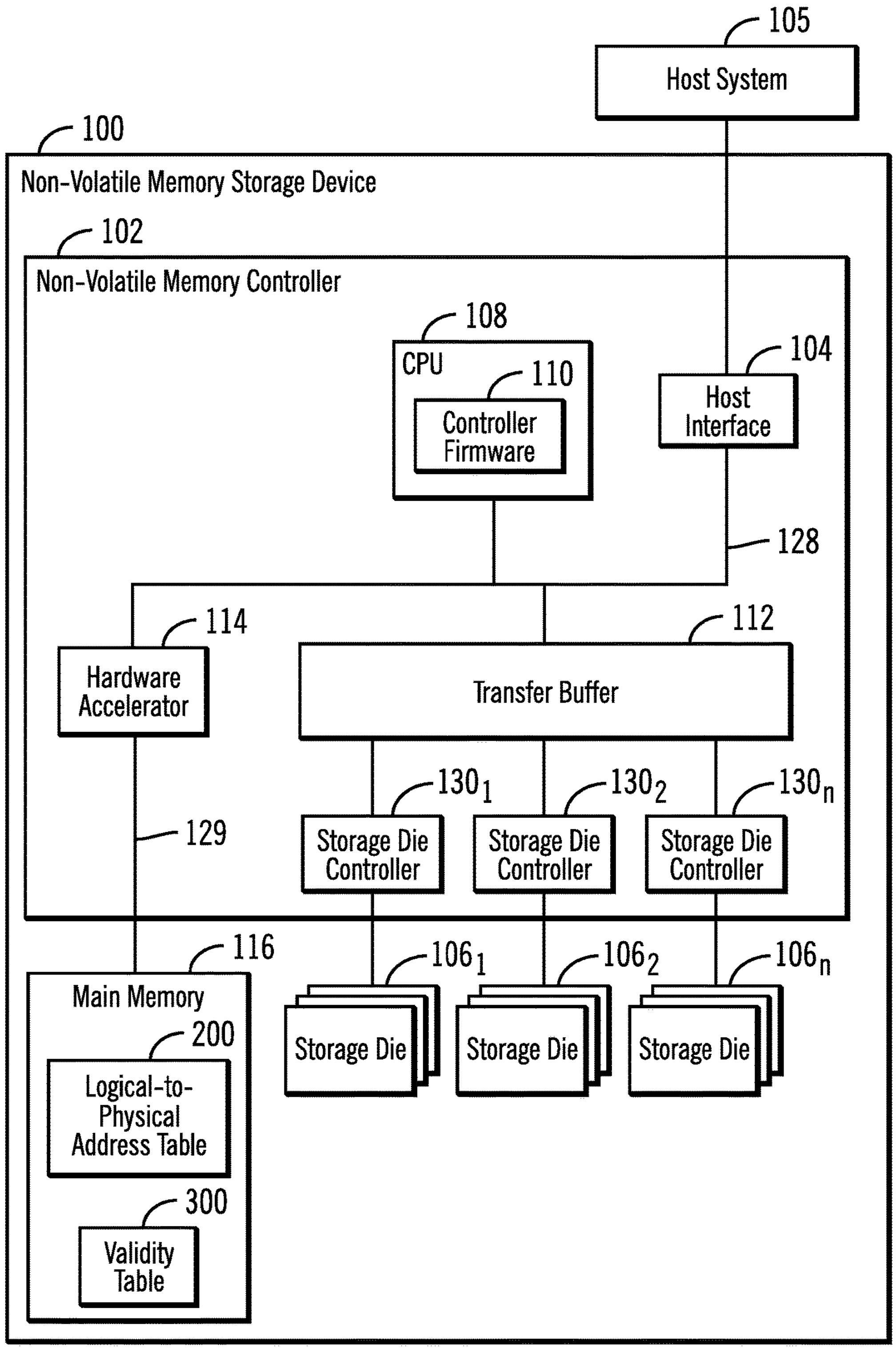
FIG. 1 illustrates an embodiment of a non-volatile memory storage device.

Described embodiments eliminate the need for the band journal in a hybrid non-volatile memory storage device that includes different types of memory devices. For instance, the non-volatile memory storage device may include a generally faster access smaller main memory to store metadata and information, such as the L2P table, that is used to manage the non-volatile memory storage, such as NAND storage, having the user data. In a NAND SSD non-volatile memory storage device, the smaller main memory may comprise a 3D Crosspoint, non-volatile DRAM, etc., to store the management information for the NAND storage implemented in NAND storage dies, having the user data. The main memory storing the management information, such as the L2P table, may comprise persistent storage (non-volatile memory), so the data does not have to be recovered.

The main memory of the non-volatile memory storage device may further maintain a validity table indicating whether the memory location in the NAND identified by the physical address has valid data. This improves performance by avoiding the need to store a band journal because storing the logical-to-physical address table in the non-volatile transfer buffer avoids the need to recover the L2P table. Further, storing the validity table avoids, during defragmentation, the need to read the band journal to determine the validity of a page, which reduces the number of read and write operations and the duration of the memory storage.

Further, described embodiments optimize operations, by having the validity table and logical-to-physical address table in the transfer buffer updated in parallel with the write operations to the non-volatile memory NAND storage. In this way the described embodiments, reduce the need for a band journal, thus saving space in the NAND storage, and replace band journal with a smaller validity table in a non-volatile transfer buffer, which accelerates the band relocation operations.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a non-volatile memory storage device 100 having a non-volatile memory (NVM) controller 102, including a host interface 104 to transfer blocks of data between a connected host system 105 and a plurality of groups of storage dies $\mathbf{106}_1$, $\mathbf{106}_2$ . . . $\mathbf{106}_n$ comprising a non-volatile memory of storage cells that may be organized into pages of storage cells, where the pages are organized into blocks. The non-volatile memory storage device 100 may function as both a memory device and/or a storage device in a computing system, and may be used to perform the role of volatile memory devices and disk drives in a computing system. In an embodiment, the non-volatile memory storage device 100 may comprise a solid state drive (SSD) of NAND storage dies 106.

The NVM controller 102 may include a central processing unit (CPU) 108 implementing controller firmware 110 managing the operations of the non-volatile memory storage device 100; a non-volatile transfer buffer 112 comprising a non-volatile memory device to cache and buffer transferred between the host 105 and storage dies $\mathbf{106}_1$, $\mathbf{106}_2$ . . . $\mathbf{106}_n$, and may comprise a Static Random Access Memory (SRAM) or other suitable non-volatile memory storage device; and a hardware accelerator 114 comprising a separate hardware device, such as an application specific integrated circuit (ASIC), in which operations directed to a logical-to-physical address table 200 and a validity table 300 maintained in a main memory 116 are offloaded to allow parallel processing while the controller firmware executing in the CPU 108 writes data to the storage dies $\mathbf{106}_1$, $\mathbf{106}_2$ . . . $\mathbf{106}_n$.

The main memory 116 stores a logical-to-physical address table 200 providing a mapping of logical addresses to which I/O requests are directed and physical addresses in the storage dies $\mathbf{106}_1$, $\mathbf{106}_2$ . . . $\mathbf{106}_n$ at which the data for the logical addresses are stored The logical addresses may comprise logical block address (LBAs) or other logical addresses known in the art. The main memory 116 further maintains a validity table 300 that indicates whether each of the physical address in the storage dies $\mathbf{106}_1$, $\mathbf{106}_2$ . . . $\mathbf{106}_n$ have valid data. A small amount of transfer buffer 112 may be used as a cache of the main memory 116 to store the logical-to-physical address table 200 or validity table 300, temporally. In embodiments where the main memory 116 comprises a different type of memory device than the storage dies $\mathbf{106}_1$, $\mathbf{106}_2$ . . . $\mathbf{106}_n$, the memory storage device 100 comprises a hybrid storage device.

The storage dies $\mathbf{106}_1$, $\mathbf{106}_2$ . . . $\mathbf{106}_n$ may comprise electrically erasable and non-volatile memory cells, such as NAND dies (e.g., single level cell (SLC), multi-level cell (MLC), triple level cell (TLC) NAND memories, etc.), a ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, SRAM, and other electrically erasable programmable read only memory (EEPROM) type devices. The transfer buffer 112 and non-volatile main memory 116 may comprise memory devices, such as described above, that are different from the NAND storage dies $\mathbf{106}_1$, $\mathbf{106}_2$ . . . $\mathbf{106}_n$. The non-volatile main memory 116 and transfer buffer 112 may comprise smaller and faster memory devices than the storage dies $\mathbf{106}_1$, $\mathbf{106}_2$ . . . $\mathbf{106}_n$.

In one embodiment, the storage dies $\mathbf{106}_1$, $\mathbf{106}_2$ . . . $\mathbf{106}_n$ comprise NAND storage, the transfer buffer 112 comprises an SRAM, and the main memory 116 comprises a non-volatile write in place addressable battery backed-up non-volatile Dynamic Random Access Memory (DRAM) or 3D crosspoint memory. In embodiments where the main memory 116 is comprised of a volatile memory, then the validity table 300 and L2P address table 200 would have to be recovered during initialization.

In one embodiment, the storage dies $\mathbf{106}_1$, $\mathbf{106}_2$ . . . $\mathbf{106}_n$ may comprise a block based read-modify-write non-volatile memory, and the main memory 116 and transfer buffer 112 may comprise a byte addressable write in place non-volatile memory.

The host system 105 may transfer write data through the host interface 104 that is stored in the transfer buffer 112. In one embodiment, the CPU 108 and hardware accelerator 114 are implemented in separate hardware components, such as different hardware components, within the non-volatile memory device 100. In this way, the controller firmware 110 and hardware accelerator 114 may perform operations in parallel to reduce processing latency.

The host interface 104 connects the memory device 100 to a host system 105. The memory device 100 may be installed or embedded within the host system 105, such as shown and described with respect to element 708 or 710 in FIG. 7, or the memory device 100 may be external to the host system. The host interface 104 may comprise a bus interface, such as a Peripheral Component Interconnect Express (PCIe) interface, Serial AT Attachment (SATA), Non-Volatile Memory Express (NVMe), etc.

The CPU 108, host interface 104, hardware accelerator 114, and transfer buffer 112 may communicate over one or more bus interfaces 128, such as a PCIe or other type of bus or interface. Data may be transferred among the host interface 104, CPU 108, transfer buffer 112, and hardware accelerator 114 over the bus 128 using Direct Memory Access (DMA) transfers, which bypass the CPU 108. Alternatively, the CPU 108 may be involved in transferring data among the host interface 104, transfer buffer 112, and storage dies $\mathbf{106}_1$, $\mathbf{106}_2$ . . . $\mathbf{106}_n$ over the bus 128. In FIG. 1, the connection between the units is shown as a bus 128. In alternative embodiments the connection among any of the components 104, 108, 114, 112 may comprise direct lines or paths and not a shared bus. The hardware accelerator 114 may be directly connected to the main memory over path 129, or the main memory 116 could be coupled to the bus 128.

The non-volatile memory storage device 100 includes storage die controllers $\mathbf{130}_1$, $\mathbf{130}_2$ . . . $\mathbf{130}_n$ that manage read and write requests to blocks of data in pages of storage cells to groups of the storage dies $\mathbf{106}_1$, $\mathbf{106}_2$ . . . $\mathbf{106}_n$ and the transfer of data between the transfer buffer 112 and the storage dies $\mathbf{106}_1$, $\mathbf{106}_2$ . . . $\mathbf{106}_n$.

In the embodiment of FIG. 1, the non-volatile memory controller 102 hardware includes the hardware accelerator 114, CPU 108, host interface 104, and transfer buffer 112. In alternative embodiment, some of these units 104, 108, 112, and 114 may be implemented in hardware external to the non-volatile memory controller 102 in the memory storage device 100.

In one embodiment, the memory controller 102 controller firmware 110 may implement the Non-Volatile Memory Express (NVMe) protocol.

Figure 2:
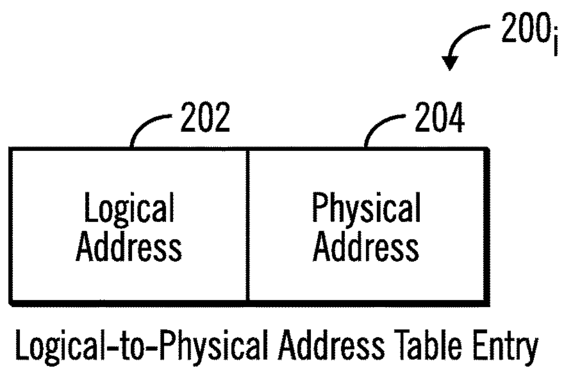
FIG. 2 illustrates an embodiment of a logical-to-physical address table entry.

FIG. 2 illustrates an embodiment of an entry $\mathbf{200}_i$ in the logical-to-physical address table 200 that provides a logical address 202 and a corresponding physical address 204 in the storage dies $\mathbf{106}_1, \mathbf{106}_2 \ldots \mathbf{106}_n$ at which data for the logical address 202 is stored. In certain embodiments, the logical address 202 may not comprise a separate field 202 in the entry $\mathbf{200}_i$ and instead the logical address may comprise the index value into the logical-to-physical address table 200.

Figure 3:
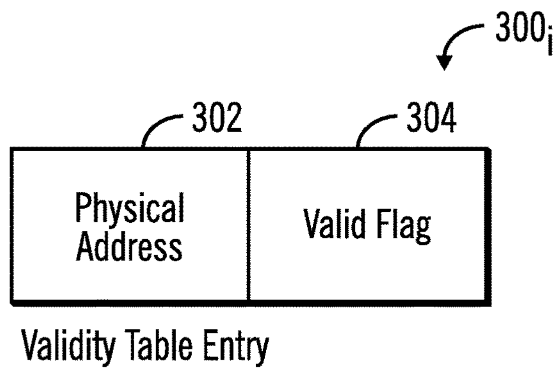
FIG. 3 illustrates an embodiment of a validity table entry.

FIG. 3 illustrates an embodiment of an entry $\mathbf{300}_i$ in the validity table 300 that provides for each physical address 302 in the storage dies $\mathbf{106}_1, \mathbf{106}_2 \ldots \mathbf{106}_n$ forming the non-volatile memory a valid flag 304 that indicates whether valid or invalid data is maintained at the physical address 302. In this way, the validity table 300 maps a physical location (physical address) to Boolean validity information. In certain embodiments, the physical address 302 may not comprise a separate field 302 in the entry $\mathbf{300}_i$ and instead the physical address may comprise the index value into the validity table 300.

Figure 4:
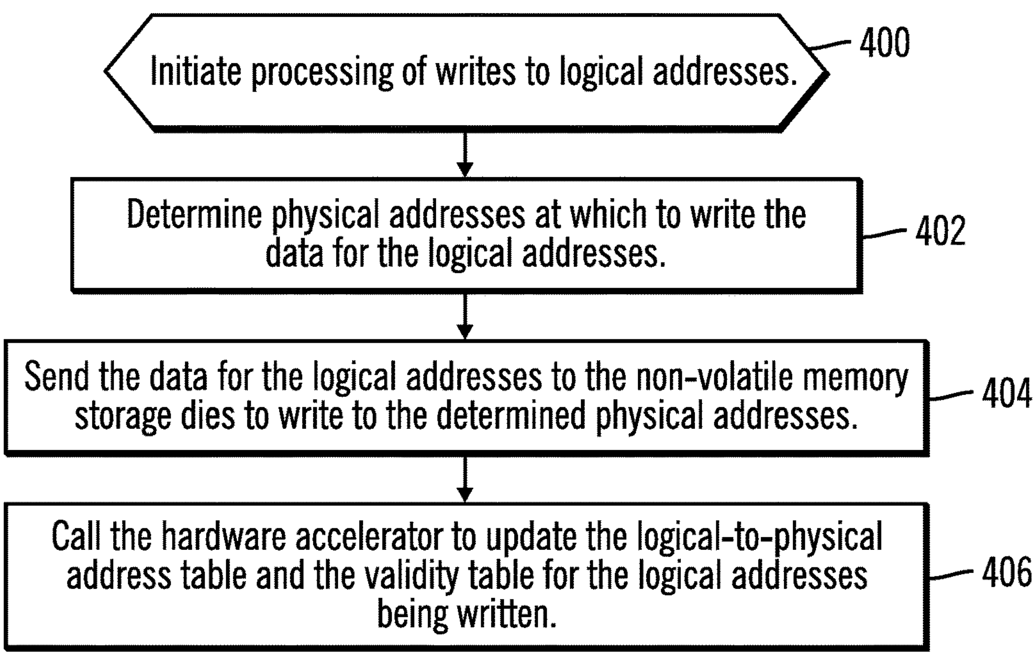
FIG. 4 illustrates an embodiment of operations to process writes to logical addresses.

FIG. 4 illustrates an embodiment of operations performed by the controller firmware 110 to process received writes to logical address. When a threshold number of writes have been received (at block 400), such as a buffer of write data in the transfer buffer 112 is filled or after each received write, the controller firmware 110 determines (at block 402) physical addresses at which to write the data for the logical addresses. The controller firmware 110 sends (at block 404) the data for the logical addresses to the non-volatile memory storage dies $\mathbf{106}_1, \mathbf{106}_2 \ldots \mathbf{106}_n$ to write to the determined physical addresses. The controller firmware 110 calls (at block 406) the hardware accelerator 114 to update (at block 406) the logical-to-physical address table 200 and validity table 300 for the logical addresses being written to the physical addresses at step 404.

In FIG. 4, writes are processed upon a buffer of write data having been received. In alternative embodiments, the operations of FIG. 4 may be performed upon receiving each write operation or less than a full buffer of write operations.

Figure 5:
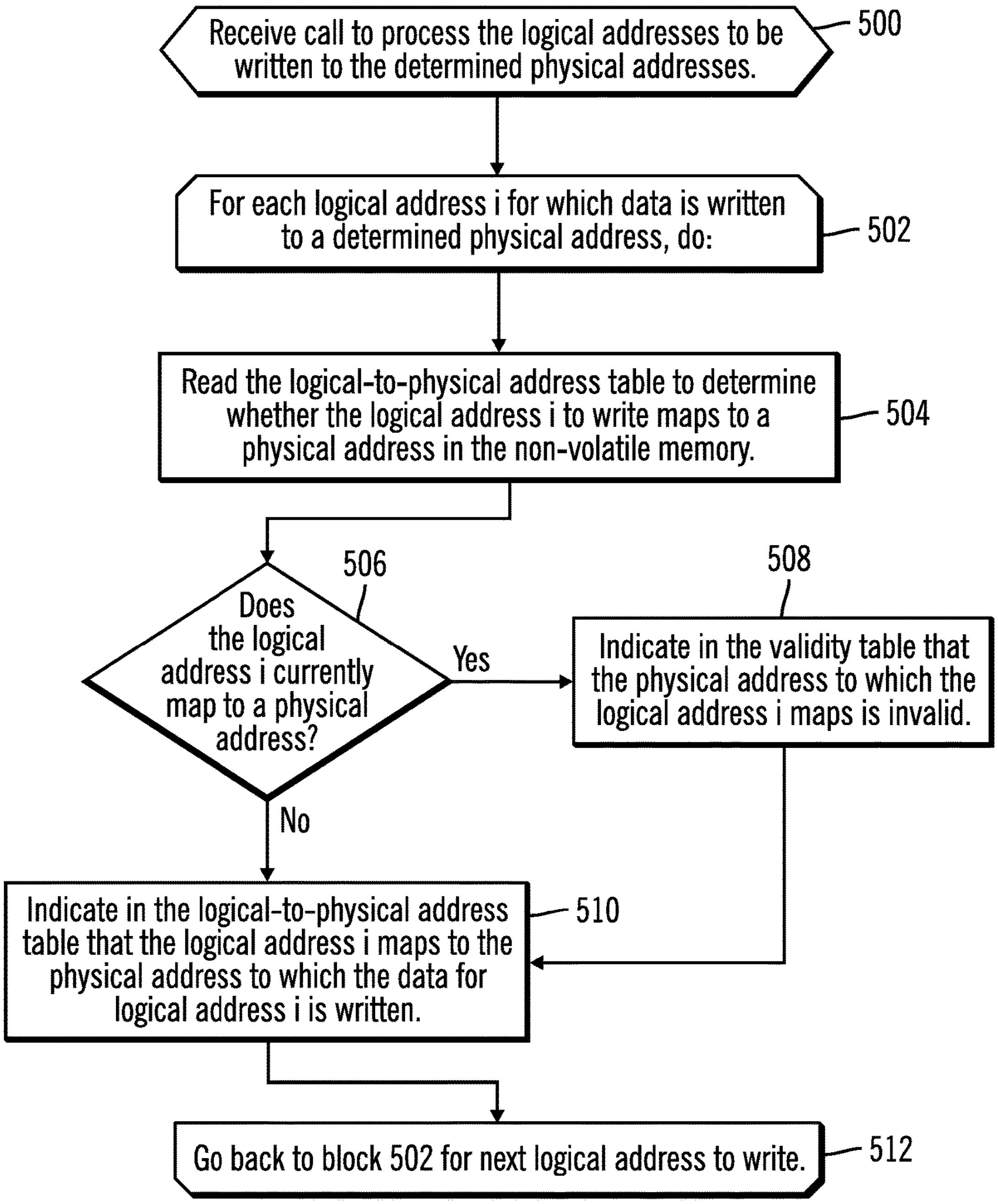
FIG. 5 illustrates an embodiment of operations to process a call to process logical addresses to be written to physical addresses.

FIG. 5 illustrates an embodiment of operations performed by the hardware accelerator 114 in response to being called to update the logical-to-physical address table 200 and validity table 300, in the main memory 116, for the logical addresses being written. In response to the call, the hardware accelerator 114 performs the operations at blocks 502 through 512 for each logical address i subject to being written. The hardware accelerator 114 reads (at block 504) the logical-to-physical address table 200 to determine whether the logical address i to write maps to a physical address 204 in the non-volatile memory, which means data for the logical address is stored in the non-volatile memory storage dies $\mathbf{106}_1, \mathbf{106}_2 \ldots \mathbf{106}_n$. Otherwise, if there is no corresponding physical address 204, then there is no data currently provided for the logical address i. If (at block 506) the logical address i currently maps to a physical address 204, then the hardware accelerator 114 indicates (at block 508) in the validity table 300 in the main memory 116 that the physical address 204 to which the logical address i maps is invalid, such as by updating the valid flag 304 for the entry 302 for the physical address 204 to indicate that the data is invalid, because the data for the logical address i is being updated. If (at block 506) the logical address i does not map to a physical address or after updating the validity table 300 (at block 508), the hardware accelerator 114 indicates (at block 510) in the logical-to-physical address table 200 in the field 204 for the entry $\mathbf{200}_i$ for logical address i that logical address i, indicated in field 202, maps to the new physical address to which the data for logical address i is written.

With the embodiment of FIG. 5, operations to update the logical-to-physical address table 200 and validity table 300 for the logical addresses being written are handled by a separate hardware accelerator 114 component accessing the main memory 116 to allow the controller firmware 110 to separately write the data for the logical addresses being written to the non-volatile memory storage dies $\mathbf{106}_1, \mathbf{106}_2 \ldots \mathbf{106}_n$. In this way, the hardware accelerator 114 and controller firmware 110 may perform parallel processing with respect to the main memory 116 and the storage dies $\mathbf{106}_1, \mathbf{106}_2 \ldots \mathbf{106}_n$ to reduce write latency. Concurrently updating the logical-to-physical address table 200 and validity table 300 does not affect the host write performance because these table update operations are performed in parallel by separate hardware with the writes to the storage dies $\mathbf{106}_1, \mathbf{106}_2 \ldots \mathbf{106}_n$.

In an alternative embodiment, the operations described with respect to the hardware accelerator 114 may be performed by the controller firmware 110, and there may be no hardware accelerator 114.

Figure 6:
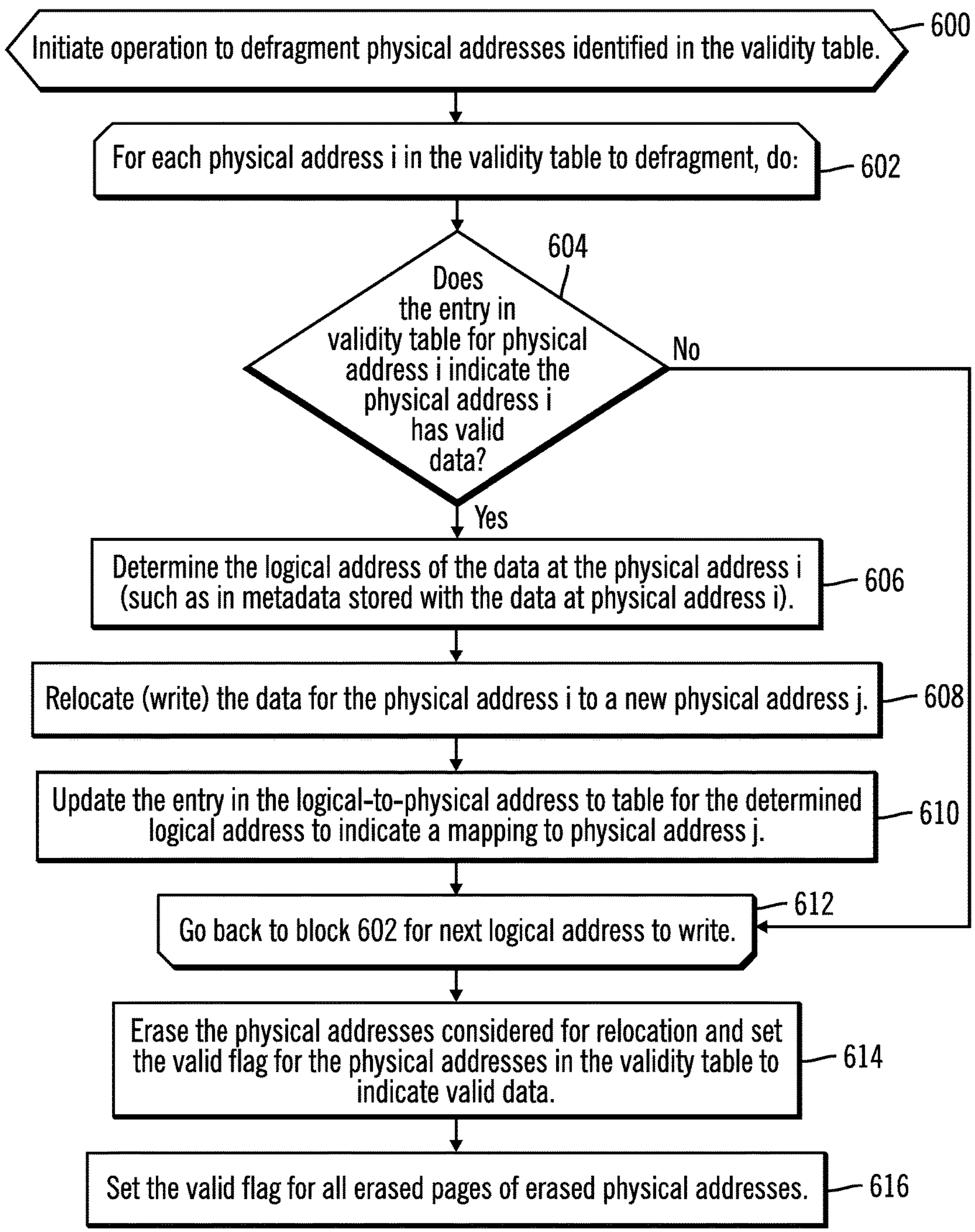
FIG. 6 illustrates an embodiment of operations to defragment physical addresses.

FIG. 6 illustrates an embodiment of operations performed by the controller firmware 110 to defragment a segment of physical addresses indicated in the validity table 300. For instance, the controller firmware 110 may perform defragmentation with respect to a band of blocks of pages in the non-volatile memory storage dies $\mathbf{106}_1, \mathbf{106}_2 \ldots \mathbf{106}_n$. The controller firmware 110 performs a loop of operations at blocks 602 through 616 for each of the physical address i of the physical addresses identified in the validity table 300 to defragment. The hardware accelerator 114 may perform the access operations with respect to the logical-to-physical address table 200 and validity table 300 to access information therefrom for the controller firmware 110. If (at block 604) the valid flag 304 in the entry $\mathbf{300}_i$ in the validity table 300 for physical address i indicates that the physical address 302 has valid data, then the controller firmware 110 determines (at block 606) the logical address of the data at the physical address i. In one embodiment, the logical address of data may be determined from metadata stored with the data at physical address i.

The controller firmware 110 relocates, i.e., writes, (at block 608) the data for physical address i to a new physical address j. The entry $\mathbf{200}_i$ in the logical-to-physical address table 200 for the determined logical address is updated (at block 610) to indicate in field 204 the new physical address j of the data for the determined logical address.

If (from the no branch of block 604) the validity table 300 indicates that the physical address i has invalid data, then that physical address i is not subject to relocating the data and control proceeds to block 612 to consider a next physical address to defragment. After processing all the physical addresses for relocation, the controller firmware 110 erases (at block 614) the locations in the storage dies $\mathbf{106}_1, \mathbf{106}_2 \ldots \mathbf{106}_n$ of the physical addresses considered for relocation and sets, through the hardware accelerator 114, the valid flag 304 for the physical addresses in the validity table 300 to indicate valid data. The valid flag 304 may be set (at block 616) to valid for all erased pages, not just those considered for relocation. Setting the valid flag 304 for all erased pages, optimizes the number of writes to the main memory 116 having the validity table 300 by obviating the need to individually mark the validity table 300 entries as valid on host writes. Since open bands are not defragged, the early-marking of the validity flag 304 will not affect the defragmentation operations.

Certain of the operations performed with respect to the logical-to-physical address table 200 and validity table 300, such as at block 604, 606, 608, and 610 may be performed by the hardware accelerator 114 to optimize operations.

Setting the valid flag 304 for the erased physical addresses to valid reduces the number of writes that are subsequently performed to the validity table 300 because the entries for the physical addresses do not need to be marked as valid when data is written to the physical addresses. Further, in certain embodiments, open bands of blocks in the storage dies $\mathbf{106}_1$, $\mathbf{106}_2$ . . . $\mathbf{106}_n$ allocated for use are not subject to defragmentation. Thus, the early marking of the physical addresses as having valid data will not result in errors because a band is only subject to defragmentation after all its physical addresses are written. In an alternative embodiment, the valid flag 304 for a physical address 302 in a validity table entry $\mathbf{300}_i$ may be set to valid when writing to the physical address.

In certain embodiments, during initialization of the validity table 300, the entries $\mathbf{300}_i$ in the validity table 300 are set to indicate the physical addresses have valid data before data is written to the physical addresses.

Figure 7:
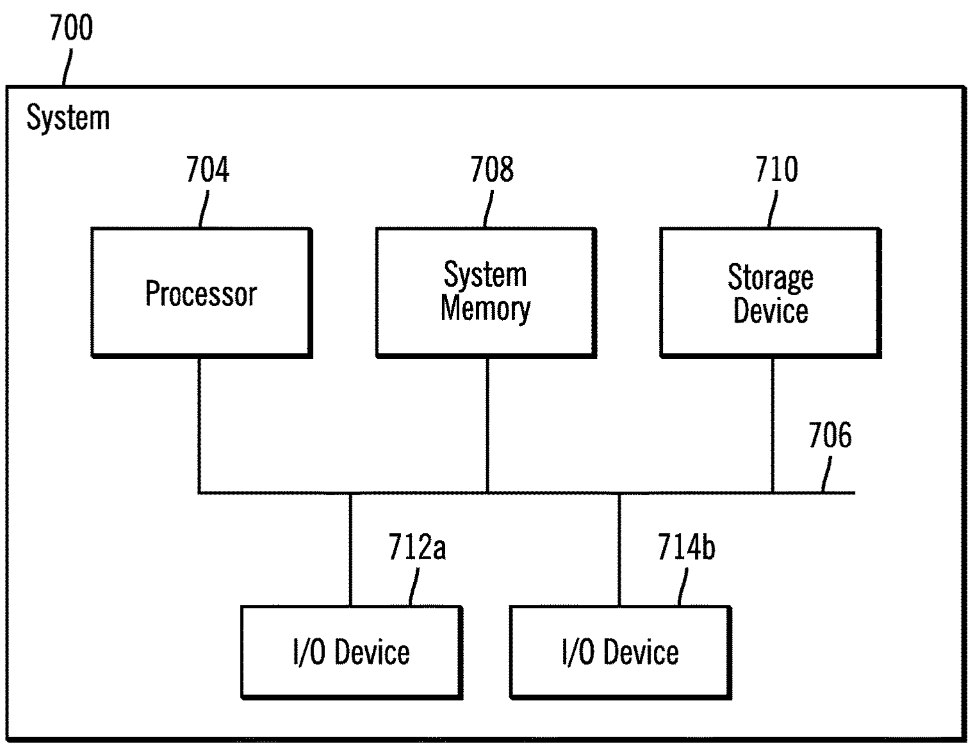
FIG. 7 illustrates an embodiment of a system in which the memory device of FIG. 1 may be deployed.

FIG. 7 illustrates an embodiment of a system 700 in which the memory device 100 may be deployed as the system memory device 708 and/or a storage device 710. The system includes a processor 704 that communicates over a bus 706 with a system memory device 708 in which programs, operands and parameters being executed are cached, and a storage device 710, which may comprise a solid state drive (SSD) that stores programs and user data that may be loaded into the system memory 708 for execution. The processor 704 may also communicate with Input/Output (I/O) devices 712*a*, 712*b*, which may comprise input devices (e.g., keyboard, touchscreen, mouse, etc.), display devices, graphics cards, ports, network interfaces, etc. The memory 708 and storage device 710 may be coupled to an interface on the system 700 motherboard, mounted on the system 700 motherboard, or deployed in an external memory device or accessible over a network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

The reference characters used herein, such as i, are used to denote a variable number of instances of an element, which may represent the same or different values, and may represent the same or different value when used with different or the same elements in different described instances.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

The following examples pertain to further embodiments.

Example 1 is an apparatus for increasing a capacity of a non-volatile memory storage device available to store user data, comprising: a non-volatile memory; and a main memory; a memory controller to read and write to the non-volatile memory and to: maintain in the main memory a logical-to-physical address table indicating, for each logical address of a plurality of logical addresses, a physical address in the non-volatile memory having data for the logical address; and maintain in the main memory a validity table indicating for each physical address of a plurality of physical addresses in the non-volatile memory whether the physical address has valid data.

In Example 2, the subject matter of examples 1 and 3-12 can optionally include that the main memory comprises one of: (1) a non-volatile memory; and (2) a volatile memory, wherein the main memory comprises the volatile memory, the validity table is recovered during power-loss recovery.

In Example 3, the subject matter of examples 1, 2 and 4-12 can optionally include that the non-volatile memory is further to: send a write operation to the non-volatile memory to write data for a logical address to a first physical address in the non-volatile memory; read the logical-to-physical address table to determine whether the logical address to write maps to a second physical address in the non-volatile memory; indicate in the validity table in the main memory that the second physical address is invalid in response to the logical-to-physical address table indicating that the logical address maps to the second physical address; and indicate in the logical-to-physical address table that the logical address to write maps to the first physical address.

In Example 4, the subject matter of examples 1-3 and 5-12 can optionally include that the memory controller is further to: initialize entries in the validity table to indicate the physical addresses have valid data before data is written to the physical addresses; and set a plurality of the entries in the validity table to indicate they have valid data after freeing the physical addresses identified by the entries for reuse.

In Example 5, the subject matter of examples 1-4 and 6-12 can optionally include that the sending the write operation to the non-volatile memory is performed in parallel with operations directed to the main memory.

In Example 6, the subject matter of examples 1-5 and 7-12 can optionally include a transfer buffer, wherein the memory controller is further to: buffer a plurality of writes to logical addresses in the transfer buffer; send write operations to the non-volatile memory to write data for the logical addresses to physical addresses in the non-volatile memory; determine whether the logical-to-physical address table indicates that the logical addresses to write map to physical addresses in the non-volatile memory; and for each of the logical addresses to write that map to a physical address in the logical-to-physical address table, indicate in the validity table in the transfer buffer that the physical address to which the logical address maps is invalid.

In Example 7, the subject matter of examples 1-6 and 8-12 can optionally include a hardware accelerator, wherein the memory controller is further to send the logical addresses of the plurality of writes in the transfer buffer to the hardware accelerator, wherein the hardware accelerator, in response to receiving the logical addresses, performs the determining whether the logical-to-physical address table in the main memory indicates that the logical addresses to write map to physical addresses, and indicating in the validity table that the physical addresses are invalid, wherein the hardware accelerator performs the operations with respect to the main memory in response to receiving the logical addresses in parallel with the memory controller writing the data for the logical addresses to the non-volatile memory.

In Example 8, the subject matter of examples 1-7 and 9-12 can optionally include that the hardware accelerator and the transfer buffer are implemented in the memory controller and wherein the main memory is external to the memory controller.

In Example 9, the subject matter of examples 1-8 and 10-12 can optionally include that the memory controller is further to: read a plurality of entries for physical addresses from the validity table; determine whether the entries indicate that the physical addresses identified by the entries have valid data; write data at the physical addresses in the non-volatile memory determined to have valid data to new physical addresses; and update the logical-to-physical address table to indicate that the logical addresses, from which data is written to the physical addresses, map to the new physical addresses to which the data for the logical addresses was written.

In Example 10, the subject matter of examples 1-9 and 11-12 can optionally include that the memory controller is further to: skip relocating the data at the physical addresses indicated in the validity table as having invalid data.

In Example 11, the subject matter of examples 1-10 and 12 can optionally include that the memory controller is further to perform, for each entry of the entries in the validity table indicated as having valid data: determine the logical address of the data at the physical address identified by the entry in the validity table as having valid data; and determine whether the determined logical address matches the logical address in the logical-to-physical address table for the physical addresses identified by the entry in the validity table, wherein the writing of the data at the physical address and the updating the logical-to-physical address table are performed in response to determining that the determined logical address matches the logical address in the logical-to-physical address table.

In Example 12, the subject matter of examples 1-11 can optionally include that the memory controller is further to perform in response processing all the read entries to determine whether to relocate data at the physical addresses: erase locations of the physical addresses in all the read entries in the validity table; and set all the entries in the validity table for erased the physical addresses to indicate valid data.

Example 13 is a system for increasing a capacity of a non-volatile memory storage device available to store user data, comprising: a host computer; and a non-volatile memory storage device coupled to the host computer, wherein the host computer communicates Input/Output (I/O) requests to the non-volatile memory storage device, comprising: a non-volatile memory; and a main memory; a memory controller to read and write to the non-volatile memory and to: maintain in the main memory a logical-to-physical address table indicating, for each logical address of a plurality of logical addresses, a physical address in the non-volatile memory having data for the logical address; and maintain in the main memory a validity table indicating for each physical address of a plurality of physical addresses in the non-volatile memory whether the physical address has valid data.

In Example 14, the subject matter of examples 13 and 15-19 can optionally include that the non-volatile memory is further to: send a write operation to the non-volatile memory to write data for a logical address to a first physical address in the non-volatile memory; read the logical-to-physical address table to determine whether the logical address to write maps to a second physical address in the non-volatile memory; indicate in the validity table in the main memory that the second physical address is invalid in response to the logical-to-physical address table indicating that the logical address maps to the second physical address; and indicate in the logical-to-physical address table that the logical address to write maps to the first physical address.

In Example 15, the subject matter of examples 13, 14 and 16-19 can optionally include that the memory controller is further to: initialize entries in the validity table to indicate the physical addresses have valid data before data is written to the physical addresses; and set a plurality of the entries in the validity table to indicate they have valid data after freeing the physical addresses identified by the entries for reuse.

In Example 16, the subject matter of examples 13-15 and 17-19 can optionally include that the sending the write operation to the non-volatile memory is performed in parallel with operations directed to the main memory.

In Example 17, the subject matter of examples 13-16 and 18-19 can optionally include a transfer buffer, wherein the memory controller is further to: buffer a plurality of writes to logical addresses in the transfer buffer; send write operations to the non-volatile memory to write data for the logical addresses to physical addresses in the non-volatile memory; determine whether the logical-to-physical address table indicates that the logical addresses to write map to physical addresses in the non-volatile memory; and for each of the logical addresses to write that map to a physical address in the logical-to-physical address table, indicate in the validity table in the transfer buffer that the physical address to which the logical address maps is invalid.

In Example 18, the subject matter of examples 13-17 and 19 can optionally include a hardware accelerator, wherein the memory controller is further to send the logical addresses of the plurality of writes in the transfer buffer to the hardware accelerator, wherein the hardware accelerator, in response to receiving the logical addresses, performs the determining whether the logical-to-physical address table in the main memory indicates that the logical addresses to write map to physical addresses, and indicating in the validity table that the physical addresses are invalid, wherein the hardware accelerator performs the operations with respect to the main memory in response to receiving the logical addresses in parallel with the memory controller writing the data for the logical addresses to the non-volatile memory.

In Example 19, the subject matter of examples 13-18 can optionally include that the memory controller is further to: read a plurality of entries for physical addresses from the validity table; determine whether the entries indicate that the physical addresses identified by the entries have valid data; write data at the physical addresses in the non-volatile memory determined to have valid data to new physical addresses; and update the logical-to-physical address table to indicate that the logical addresses, from which data is written to the physical addresses, map to the new physical addresses to which the data for the logical addresses was written.

Example 20 is a method for managing operations in a non-volatile memory storage device having non-volatile memory and for increasing a capacity of the non-volatile memory storage device available to store user data, comprising: maintaining in a main memory a logical-to-physical address table indicating, for each logical address of a plurality of logical addresses, a physical address in the non-volatile memory having data for the logical address; and maintaining in the main memory a validity table indicating for each physical address of a plurality of physical addresses in the non-volatile memory whether the physical address has valid data.

In Example 21, the subject matter of examples 20 and 22-25 can optionally include sending a write operation to the non-volatile memory to write data for a logical address to a first physical address in the non-volatile memory; reading the logical-to-physical address table to determine whether the logical address to write maps to a second physical address in the non-volatile memory; indicating in the validity table in the main memory that the second physical address is invalid in response to the logical-to-physical address table indicating that the logical address maps to the second physical address; and indicating in the logical-to-physical address table that the logical address to write maps to the first physical address.

In Example 22, the subject matter of examples 20, 21, 23-25 can optionally include initializing entries in the validity table to indicate the physical addresses have valid data before data is written to the physical addresses; and setting a plurality of the entries in the validity table to indicate they have valid data after freeing the physical addresses identified by the entries for reuse.

In Example 23, the subject matter of examples 20-22, 24, and 25 can optionally include that the sending the write operation to the non-volatile memory is performed in parallel with operations directed to the main memory.

In Example 24, the subject matter of examples 20-23, and 25 can optionally include: buffering a plurality of writes to logical addresses in a transfer buffer; sending write operations to the non-volatile memory to write data for the logical addresses to physical addresses in the non-volatile memory; determining whether the logical-to-physical address table indicates that the logical addresses to write map to physical addresses in the non-volatile memory; and for each of the logical addresses to write that map to a physical address in the logical-to-physical address table, indicating in the validity table in the transfer buffer that the physical address to which the logical address maps is invalid.

In Example 25, the subject matter of examples 20-24 can optionally include reading a plurality of entries for physical addresses from the validity table; determining whether the entries indicate that the physical addresses identified by the entries have valid data; writing data at the physical addresses in the non-volatile memory determined to have valid data to new physical addresses; and updating the logical-to-physical address table to indicate that the logical addresses, from which data is written to the physical addresses, map to the new physical addresses to which the data for the logical addresses was written.

Example 26 is an apparatus for managing operations in a non-volatile memory storage device having non-volatile memory and for increasing a capacity of the non-volatile memory storage device available to store user data, comprising: means for maintaining in a main memory a logical-to-physical address table indicating, for each logical address of a plurality of logical addresses, a physical address in the non-volatile memory having data for the logical address; and means for maintaining in the main memory a validity table indicating for each physical address of a plurality of physical addresses in the non-volatile memory whether the physical address has valid data.

What is claimed:

1. An apparatus comprising a memory controller in communication with a non-volatile memory and a main memory, wherein the memory controller is to read and write to the non-volatile memory and to:

maintain in the main memory a logical-to-physical address table indicating, for each logical address of a plurality of logical addresses, a physical address in the non-volatile memory having data for the logical address;

maintain in the main memory a validity table indicating for each physical address of a plurality of physical addresses in the non-volatile memory whether the physical address has valid data, wherein the logical-to-physical address table and the validity table are separate tables; and perform operations to at least one of the logical-to-physical address table and the validity table in parallel with write operations to the non-volatile memory.

2. The apparatus of claim 1, wherein the main memory comprises one of:

(1) a non-volatile memory; and (2) a volatile memory, wherein the main memory comprises the volatile memory and the validity table is recovered during power-loss recovery.

3. An apparatus comprising a memory controller in communication with a non-volatile memory and a main memory, wherein the memory controller is to read and write to the non-volatile memory and to:

maintain in the main memory a logical-to-physical address table indicating, for each logical address of a plurality of logical addresses, a physical address in the non-volatile memory having data for the logical address;

maintain in the main memory a validity table indicating for each physical address of a plurality of physical addresses in the non-volatile memory whether the physical address has valid data;

send a write operation to the non-volatile memory to write data for a logical address to a first physical address in the non-volatile memory;

read the logical-to-physical address table to determine whether the logical address to write maps to a second physical address in the non-volatile memory;

indicate in the validity table in the main memory that the second physical address is invalid in response to the logical-to-physical address table indicating that the logical address maps to the second physical address; and indicate in the logical-to-physical address table that the logical address to write maps to the first physical address.

4. The apparatus of claim 3, wherein the memory controller is further to:

initialize entries in the validity table to indicate the physical addresses have valid data before data is written to the physical addresses; and set a plurality of the entries in the validity table to indicate they have valid data after freeing the physical addresses identified by the entries for reuse.

5. The apparatus of claim 3, wherein to send the write operation to the non-volatile memory is performed in parallel with operations directed to the main memory.

6. The apparatus of claim 1, further comprising:
a transfer buffer,
wherein the memory controller is further to:
buffer a plurality of writes to logical addresses in the transfer buffer;
send write operations to the non-volatile memory to write data for the logical addresses to physical addresses in the non-volatile memory;
determine whether the logical-to-physical address table indicates that the logical addresses to write map to physical addresses in the non-volatile memory; and
for each logical address of the logical addresses to write that map to a physical address in the logical-to-physical address table, indicate in the validity table that the physical address to which the logical address maps is invalid.

7. The apparatus of claim 6, further comprising:
a hardware accelerator,
wherein the memory controller is further to send the logical addresses of the plurality of writes in the transfer buffer to the hardware accelerator, wherein the hardware accelerator, in response to receiving the logical addresses, performs the to determine whether the logical-to-physical address table in the main memory indicates that the logical addresses to write map to physical addresses, and the to indicate in the validity table that the physical addresses are invalid, wherein the hardware accelerator performs the operations with respect to the main memory in response to receiving the logical addresses in parallel with the memory controller writing the data for the logical addresses to the non-volatile memory.

8. The apparatus of claim 7, wherein the hardware accelerator and the transfer buffer are implemented in the memory controller and wherein the main memory is external to the memory controller.

9. The apparatus of claim 1, wherein the memory controller is further to:
read a plurality of entries for physical addresses from the validity table;
determine whether the entries indicate that the physical addresses identified by the entries have valid data;
write data at the physical addresses in the non-volatile memory determined to have valid data to new physical addresses; and
update the logical-to-physical address table to indicate that the logical addresses, from which data is written to the physical addresses, map to the new physical addresses to which the data for the logical addresses was written.

10. The apparatus of claim 9, wherein the memory controller is further to:
skip relocating the data at the physical addresses indicated in the validity table as having invalid data.

11. The apparatus of claim 9, wherein the memory controller is further to perform, for each entry of the entries in the validity table indicated as having valid data:
determine a logical address of the data at a physical address identified by the entry in the validity table as having valid data; and
determine whether the determined logical address matches the logical address in the logical-to-physical address table for the physical addresses identified by the entry in the validity table, wherein the to write the data at the physical address and the to update the logical-to-physical address table are performed in response to determining that the determined logical address matches the logical address in the logical-to-physical address table.

12. The apparatus of claim 9, wherein the memory controller is further to perform in response to processing all the read entries to determine whether to relocate data at the physical addresses:
erase locations of the physical addresses in all the read entries in the validity table; and
set all the entries in the validity table for erased the physical addresses to indicate valid data.

13. A system comprising a non-volatile memory storage device in communication with a host computer that communicates Input/Output (I/O) requests to the non-volatile memory storage device, comprising:
a non-volatile memory; and
a main memory;
a memory controller to read and write to the non-volatile memory and to:
maintain in the main memory a logical-to-physical address table indicating, for each logical address of a plurality of logical addresses, a physical address in the non-volatile memory having data for the logical address;
maintain in the main memory a validity table indicating for each physical address of a plurality of physical addresses in the non-volatile memory whether the physical address has valid data, wherein the logical-to-physical address table and the validity table are separate tables; and
perform operations to at least one of the logical-to-physical address table and the validity table in parallel with write operations to the non-volatile memory.

14. An A system comprising a non-volatile memory storage device in communication with a host computer that communicates Input/Output (I/O) requests to the non-volatile memory storage device, comprising:
a non-volatile memory; and
a main memory;
a memory controller to read and write to the non-volatile memory and to:
maintain in the main memory a logical-to-physical address table indicating, for each logical address of a plurality of logical addresses, a physical address in the non-volatile memory having data for the logical address;
maintain in the main memory a validity table indicating for each physical address of a plurality of physical addresses in the non-volatile memory whether the physical address has valid data;
send a write operation to the non-volatile memory to write data for a logical address to a first physical address in the non-volatile memory;
read the logical-to-physical address table to determine whether the logical address to write maps to a second physical address in the non-volatile memory;
indicate in the validity table in the main memory that the second physical address is invalid in response to the logical-to-physical address table indicating that the logical address maps to the second physical address; and
indicate in the logical-to-physical address table that the logical address to write maps to the first physical address.

15. The system of claim 14, wherein the memory controller is further to:

initialize entries in the validity table to indicate the physical addresses have valid data before data is written to the physical addresses; and set a plurality of the entries in the validity table to indicate they have valid data after freeing the physical addresses identified by the entries for reuse.

16. The system of claim 14, wherein to send the write operation to the non-volatile memory is performed in parallel with operations directed to the main memory.

17. The system of claim 13, further comprising:

a transfer buffer, wherein the memory controller is further to:

buffer a plurality of writes to logical addresses in the transfer buffer;

send write operations to the non-volatile memory to write data for the logical addresses to physical addresses in the non-volatile memory;

determine whether the logical-to-physical address table indicates that the logical addresses to write map to physical addresses in the non-volatile memory; and for each of logical address the logical addresses to write that map to a physical address in the logical-to-physical address table, indicate in the validity table that the physical address to which the logical address maps is invalid.

18. The system of claim 17, further comprising:

a hardware accelerator, wherein the memory controller is further to send the logical addresses of the plurality of writes in the transfer buffer to the hardware accelerator, wherein the hardware accelerator, in response to receiving the logical addresses, performs the to determine whether the logical-to-physical address table in the main memory indicates that the logical addresses to write map to physical addresses, and the to indicate in the validity table that the physical addresses are invalid, wherein the hardware accelerator performs the operations with respect to the main memory in response to receiving the logical addresses in parallel with the memory controller writing the data for the logical addresses to the non-volatile memory.

19. The system of claim 13, wherein the memory controller is further to:

read a plurality of entries for physical addresses from the validity table;

determine whether the entries indicate that the physical addresses identified by the entries have valid data;

write data at the physical addresses in the non-volatile memory determined to have valid data to new physical addresses; and update the logical-to-physical address table to indicate that the logical addresses, from which data is written to the physical addresses, map to the new physical addresses to which the data for the logical addresses was written.

20. A method for managing operations in a non-volatile memory storage device having non-volatile memory, comprising:

maintaining in a main memory a logical-to-physical address table indicating, for each logical address of a plurality of logical addresses, a physical address in the non-volatile memory having data for the logical address;

maintaining in the main memory a validity table indicating for each physical address of a plurality of physical addresses in the non-volatile memory whether the physical address has valid data, wherein the logical-to-physical address table and the validity table are separate tables; and performing operations to at least one of the logical-to-physical address table and the validity table in parallel with write operations to the non-volatile memory.

21. A method for managing operations in a non-volatile memory storage device having non-volatile memory, comprising:

maintaining in a main memory a logical-to-physical address table indicating, for each logical address of a plurality of logical addresses, a physical address in the non-volatile memory having data for the logical address;

maintaining in the main memory a validity table indicating for each physical address of a plurality of physical addresses in the non-volatile memory whether the physical address has valid data;

sending a write operation to the non-volatile memory to write data for a logical address to a first physical address in the non-volatile memory;

reading the logical-to-physical address table to determine whether the logical address to write maps to a second physical address in the non-volatile memory;

indicating in the validity table in the main memory that the second physical address is invalid in response to the logical-to-physical address table indicating that the logical address maps to the second physical address; and indicating in the logical-to-physical address table that the logical address to write maps to the first physical address.

22. The method of claim 21, further comprising:

initializing entries in the validity table to indicate the physical addresses have valid data before data is written to the physical addresses; and setting a plurality of the entries in the validity table to indicate they have valid data after freeing the physical addresses identified by the entries for reuse.

23. The method of claim 21, wherein the sending the write operation to the non-volatile memory is performed in parallel with operations directed to the main memory.

24. The method of claim 20, further comprising:

buffering a plurality of writes to logical addresses in a transfer buffer;

sending write operations to the non-volatile memory to write data for the logical addresses to physical addresses in the non-volatile memory;

determining whether the logical-to-physical address table indicates that the logical addresses to write map to physical addresses in the non-volatile memory; and for each logical address of the logical addresses to write that map to a physical address in the logical-to-physical address table, indicating in the validity table in the transfer buffer that the physical address to which the logical address maps is invalid.

25. The method of claim 20, further comprising:

reading a plurality of entries for physical addresses from the validity table;

determining whether the entries indicate that the physical addresses identified by the entries have valid data;

writing data at the physical addresses in the non-volatile memory determined to have valid data to new physical addresses; and updating the logical-to-physical address table to indicate that the logical addresses, from which data is written to the physical addresses, map to the new physical addresses to which the data for the logical addresses was written.

* * * * *